(12) United States Patent
Kotanaka (10) Patent No.: US 12,173,813 B2
(45) Date of Patent: Dec. 24, 2024

(54) HIGH-PRESSURE HOSE

(71) Applicant: BRIDGESTONE CORPORATION, Tokyo (JP)

(72) Inventor: Yoichi Kotanaka, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 437 days.

(21) Appl. No.: 17/785,048

(22) PCT Filed: Dec. 7, 2020

(86) PCT No.: PCT/JP2020/045501
§ 371 (c)(1),
(2) Date: Jun. 14, 2022

(87) PCT Pub. No.: WO2021/124956
PCT Pub. Date: Jun. 24, 2021

(65) Prior Publication Data
US 2023/0032721 A1 Feb. 2, 2023

(30) Foreign Application Priority Data

Dec. 19, 2019 (JP) .................................. 2019-229174

(51) Int. Cl.
*F16L 11/08* (2006.01)
(52) U.S. Cl.
CPC .................................. *F16L 11/088* (2013.01)
(58) Field of Classification Search
CPC .... F16L 11/16; F16L 11/24; F16L 9/12; F16L 9/16
(Continued)

(56) References Cited

U.S. PATENT DOCUMENTS 1,478,083 A 12/1923 Whitmarsh
3,234,970 A * 2/1966 Baker ........................ F16L 9/16
138/144
(Continued)

FOREIGN PATENT DOCUMENTS

CN 103115202 A 5/2013
FR 2554204 A1 5/1985
(Continued)

OTHER PUBLICATIONS

Yan Xiong, Technical Textiles, 2nd Edition, Donghua University Press, Jan. 2013, p. 199.
(Continued)

*Primary Examiner* — Patrick F Brinson
(74) *Attorney, Agent, or Firm* — SOLARIS Intellectual Property Group, PLLC (57) ABSTRACT

A high-pressure hose includes an inner tube layer, a cord reinforcing layer, an outer tube layer, and a woven underlay-layer. The cord reinforcing layer is configured of a reinforcing cord wound in a spiral shape and disposed at a radial direction outer side of the inner tube layer. The outer tube layer is disposed at the radial direction outer side of the cord reinforcing layer. The woven underlay-layer is configured of n sheets of a strip-shaped woven underlay-material overlapped with one another and wound in a spiral shape, is disposed between the inner tube layer and the cord reinforcing layer, and includes an overlap portion where one width direction side portion and another width direction side portion of the same strip-shaped woven underlay-material are overlapped with one another. The woven underlay-layer is configured entirely by at least n layers of the strip-shaped woven underlay-material, and a number of overlaps of the strip-shaped woven underlay-material at the overlap portion is n+1, wherein n≥2.

16 Claims, 4 Drawing Sheets

(58) Field of Classification Search
USPC .................. 138/123–127, 129, 130, 144, 172
See application file for complete search history.

(56) References Cited

U.S. PATENT DOCUMENTS

| | | | |
|---|---|---|---|
| 3,266,527 A * | 8/1966 | Ross | F16L 11/085 |
| | | | 138/125 |
| 3,481,368 A | 12/1969 | Vansickle et al. | |
| 6,003,561 A * | 12/1999 | Brindza | F16L 11/088 |
| | | | 138/124 |
| 7,530,372 B2 * | 5/2009 | Gerez | F16L 11/082 |
| | | | 138/144 |
| 8,807,174 B2 * | 8/2014 | Martucci | B29C 48/09 |
| | | | 138/144 |
| 2004/0062895 A1 | 4/2004 | Sausner et al. | |
| 2008/0029178 A1 * | 2/2008 | Bentley | F16L 11/125 |
| | | | 138/109 |
| 2009/0159145 A1 | 6/2009 | Amstutz | |
| 2013/0312862 A1 * | 11/2013 | Kalman | B32B 5/26 |
| | | | 156/60 |

FOREIGN PATENT DOCUMENTS

| | | |
|---|---|---|
| JP | S59-029194 Y | 8/1984 |
| JP | H09-203484 A | 8/1997 |
| JP | 2001-254874 A | 9/2001 |
| JP | 2005-76761 A | 3/2005 |
| JP | 2008-101681 A | 5/2008 |
| JP | 2008-267430 A | 11/2008 |
| JP | 2010-216623 A | 9/2010 |
| JP | 2012-077896 A | 4/2012 |
| JP | 4967589 B2 | 7/2012 |
| JP | 2019-105354 A | 6/2019 |
| WO | 2011/006963 A1 | 1/2011 |
| WO | 2019/186099 A1 | 10/2019 |
| WO | 2019/208563 A1 | 10/2019 |

OTHER PUBLICATIONS

Search Report of the Chinese office action dated Aug. 8, 2024, from the SIPO in a Chinese patent application No. 2020800875454 corresponding to the instant patent application.
Extended European Search Report dated Dec. 14, 2022 issued in corresponding EP Patent Application No. 20904132.6.
Search Report of the Chinese office action dated Jan. 16, 2024, from the SIPO in a Chinese patent application No. 2020800875454 corresponding to the instant patent application.
International Search Report issued in International Application No. PCT/JP2020/045501 on Jan. 26, 2021.

* cited by examiner

FIG.4

HIGH-PRESSURE HOSE

TECHNICAL FIELD

The present disclosure relates to a high-pressure hose.

BACKGROUND ART

High-pressure hoses include a high-pressure hose with an insert cloth layer disposed between an inner tube layer and a cord reinforcing layer in which a reinforcing cord is wound in a spiral shape (see, for example, Japanese Patent Application Laid-Open (JP-A) No. 2008-101681). Note that such an insert cloth layer is also referred to as a woven underlay-layer.

SUMMARY OF INVENTION

Technical Problem

As described in JP-A No. 2008-101681, there has already been investigation into forming such a woven underlay-layer by winding a woven underlay-material in a spiral shape between the inner tube layer and the cord reinforcing layer.

Winding the woven underlay-material in a spiral shape not only improves durability and pressure resistance of the high-pressure hose, but also improves durability (anti-bulge performance) by dispersing and alleviating compression stress occurring due to swaging of fittings and so on.

However, when there is just one layer (one sheet) of the woven underlay-layer, there is a concern regarding pressure resistance. If a high tension is applied to a wire of the reinforcing layer disposed at the outer side of the woven underlay-layer, there is a concern that this reinforcing layer wire might dig in between the cords configuring the woven underlay-layer, and the woven underlay-layer and the inner tube layer might be damaged as a result.

If the woven underlay-material is overlapped and wound in a spiral shape in order prevent the wire from digging in, its relative thickness increases and the outer periphery of the high-pressure hose becomes uneven. For example, if one sheet of tape-shaped woven underlay-material is wound in a spiral shape such that one width direction portion thereof overlaps, the woven underlay-material is formed with a one-layered portion and a two-layered portion. The woven underlay-layer is thereby formed with a thin portion and a thick portion, and becomes uneven.

Note that in order to improve the durability of the high-pressure hose, it would be conceivable to overlay plural sheets of woven underlay-material and wind them in a spiral shape.

As an example, a woven underlay-layer configured by overlaying two sheets of woven underlay-material and winding them in a spiral shape is formed with a portion where two layers of the woven underlay-material overlap and a portion where four layers overlap. In cases in which one sheet of woven underlay-material is wound in a spiral shape, a height difference of unevenness between the one-layered portion and the two-layered portion equates to the thickness of one sheet of the woven underlay-material. However, in cases in which two sheets of woven underlay-material are overlaid and wound in a spiral shape, a height difference of unevenness between the two-layered portion and the four-layered portion equates to the thickness of two sheets of the woven underlay-material.

Thus, a woven underlay-layer formed by overlaying two sheets of woven underlay-material and winding them in a spiral shape has a greater height difference of unevenness in the woven underlay-layer than a woven underlay-layer formed by winding one sheet of woven underlay-material in a spiral shape.

As a result, the high-pressure hose is affected by the large height difference of the unevenness in the woven underlay-layer, such that unevenness with a large height difference is also formed in an outer peripheral portion of the high-pressure hose, which is detrimental to its external appearance. Moreover, there is an issue that flexibility is reduced by the increase in the number of overlaps (number of layers) of the woven underlay-material, such that there is room for improvement from the perspective of flexibility and external appearance.

In consideration of the above circumstances, an object of the present disclosure is to provide a high-pressure hose that improves flexibility and also improves external appearance.

Solution to Problem

A high-pressure hose according to a first aspect of the present disclosure includes an inner tube layer, a cord reinforcing layer, an outer tube layer, and a woven underlay-layer. The cord reinforcing layer is configured of a reinforcing cord wound in a spiral shape and disposed at a radial direction outer side of the inner tube layer. The outer tube layer is disposed at the radial direction outer side of the cord reinforcing layer. The woven underlay-layer is configured of n sheets of a strip-shaped woven underlay-material overlapped with one another and wound in a spiral shape, is disposed between the inner tube layer and the cord reinforcing layer, and includes an overlap portion at which one side portion and another side portion in a width direction of the same strip-shaped woven underlay-material are overlapped with one another. The woven underlay-layer is configured entirely by at least n layers of the strip-shaped woven underlay-material, and a number of overlaps of the strip-shaped woven underlay-material at the overlap portion is n+1, wherein n≥2.

In the high-pressure hose according to the first aspect, the woven underlay-layer that is configured by winding the n sheets of strip-shaped woven underlay-material in a spiral shape is provided between the inner tube layer and the reinforcing cord layer. This enables compression stress occurring due to swaging a swage fitting of a joint to be dispersed and alleviated at the woven underlay-layer. Note that the woven underlay-layer also includes a function of protecting the inner tube layer when the reinforcing cord layer is wound on.

The woven underlay-layer includes the overlap portion at which the one side portion and the other side portion in the width direction of the same strip-shaped woven underlay-material are overlapped with one another. This enables the reinforcing cord of the cord reinforcing layer to be suppressed from digging into the woven underlay-layer compared to cases in which there is no overlap portion.

The high-pressure hose according to the first aspect includes the woven underlay-layer configured entirely by the n sheets of the strip-shaped woven underlay-material, and the number of overlaps of the strip-shaped woven underlay-material at the overlap portion is n+1. Thus, the thickness of the woven underlay-layer at the overlap portion is suppressed compared to a high-pressure hose configured entirely by n sheets of strip-shaped woven underlay-material and having the number of overlaps of the strip-shaped woven underlay-material at the overlap portion being n×2. Namely, even if the number of sheets of strip-shaped woven underlay-material increases, a height difference of unevenness at the woven underlay-layer only equates to a thickness of one sheet of the strip-shaped woven underlay-material.

Thus, in the high-pressure hose of the first aspect, flexibility is improved, and a height difference of indents in the outer periphery thereof is reduced such that the external appearance is improved, compared to a high-pressure hose having the number of overlaps of the strip-shaped woven underlay-material at the overlap portion being n×2.

Advantageous Effects of Invention

As described above, the high-pressure hose of the present disclosure includes excellent advantageous effects of enabling detriment to external appearance and a reduction in flexing performance to be suppressed, while securing durability.

DESCRIPTION OF EMBODIMENTS

Figure 1:
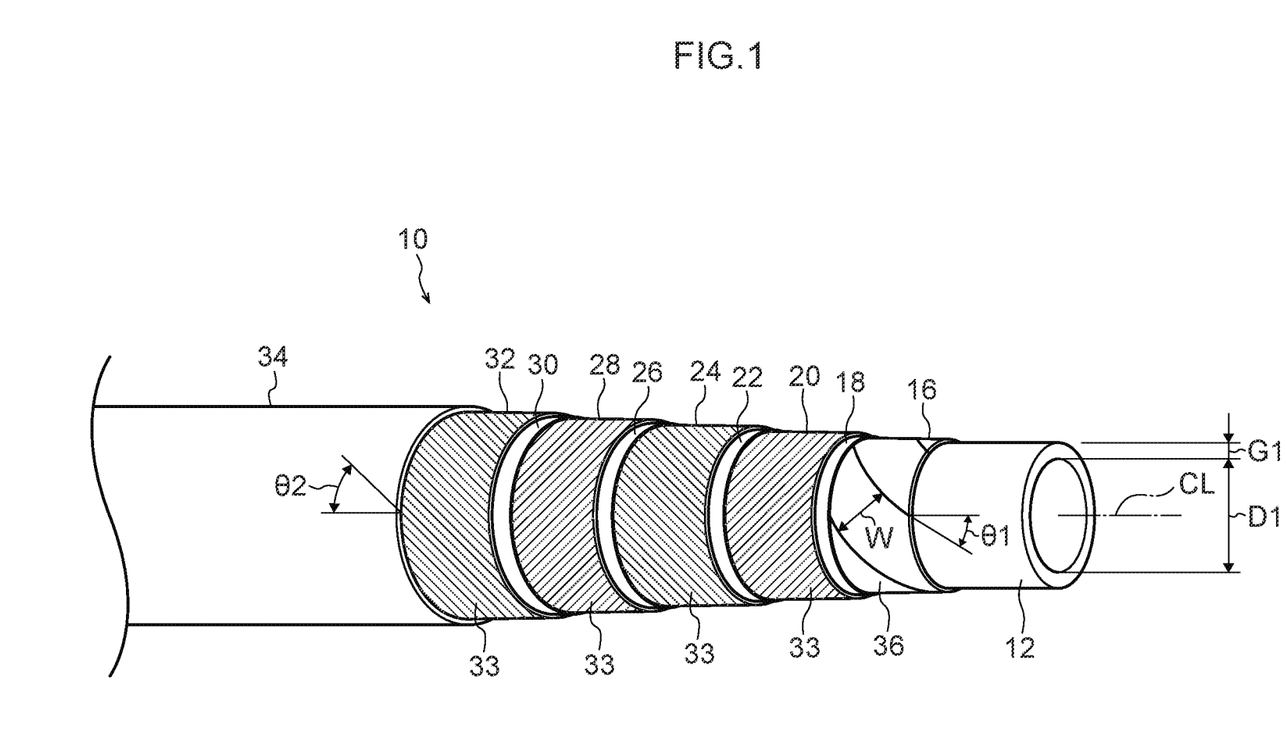
FIG. 1 is a partially exploded perspective view illustrating a high-pressure hose according to an exemplary embodiment of the present disclosure.
Figure 2:
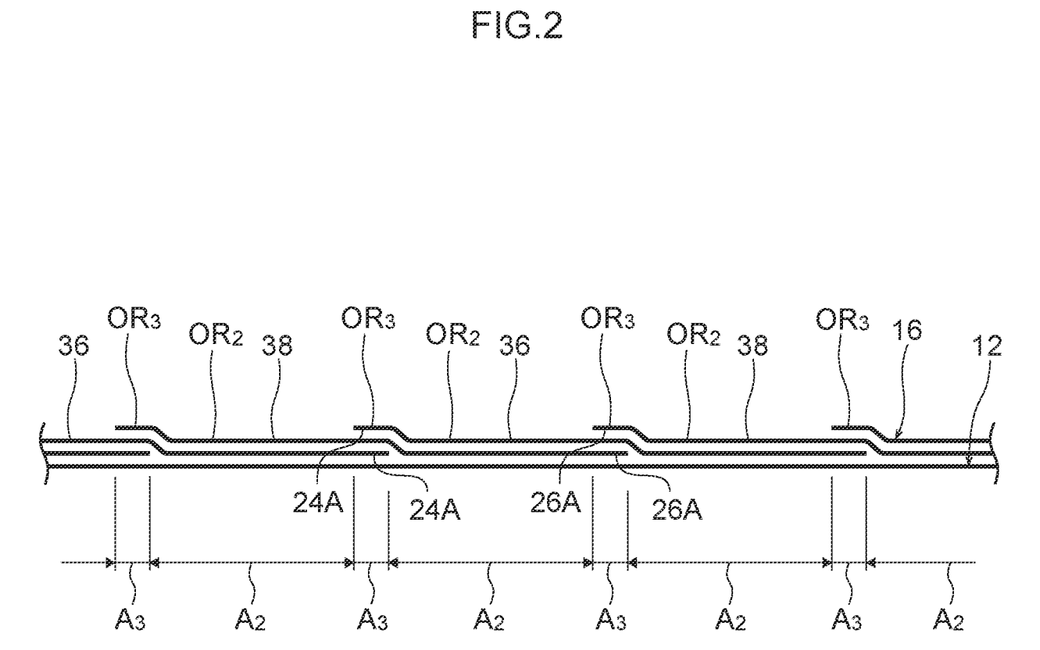
FIG. 2 is a cross-section taken along an axial line, illustrating an internal structure of a high-pressure hose according to an exemplary embodiment of the present disclosure.
Figure 3:
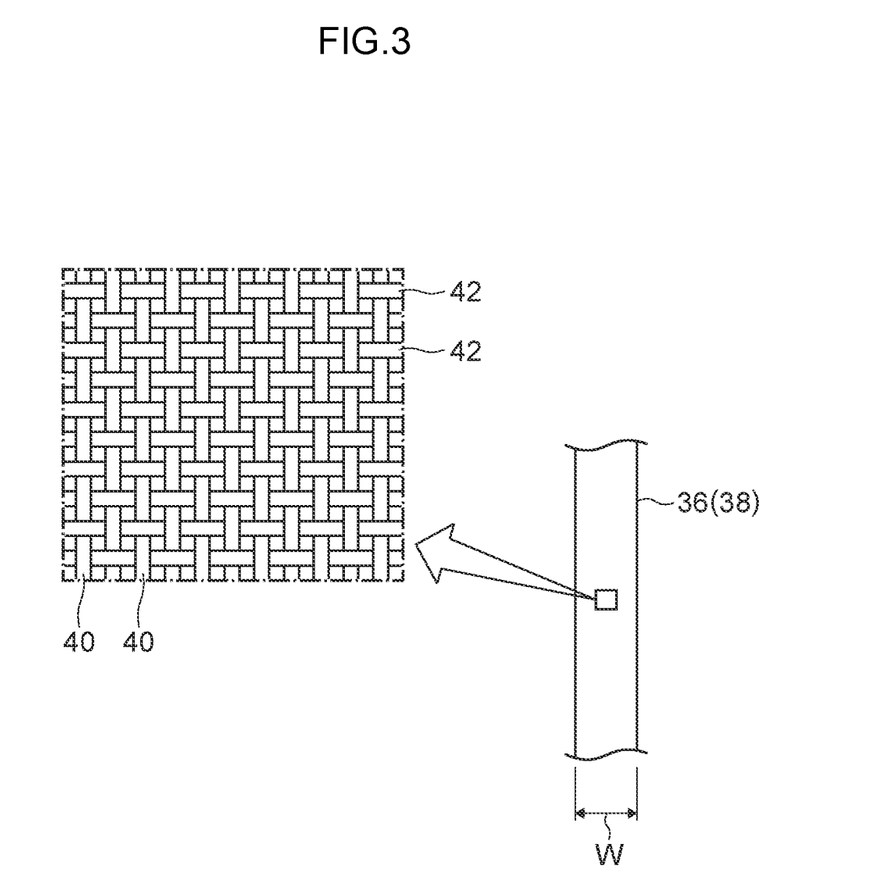
FIG. 3 is a plan view illustrating part of a woven underlay-material.

Explanation follows regarding a high-pressure hose 10 according to an exemplary embodiment of the present disclosure, with reference to FIG. 1 to FIG. 3.

As illustrated in FIG. 1, the high-pressure hose 10 of the present exemplary embodiment includes an inner tube layer 12 formed of an elastic material such as rubber. A woven underlay-layer 16, an intermediate layer 18, a first reinforcing cord layer 20, an intermediate layer 22, a second reinforcing cord layer 24, an intermediate layer 26, a third reinforcing cord layer 28, an intermediate layer 30, a fourth reinforcing cord layer 32, and an outer tube layer 34 are formed in sequence at an outer peripheral side of the inner tube layer 12.

Inner Tube Layer

An elastic material such as rubber that is employed in general high-pressure hoses is employed as the inner tube layer 12. Note that the inner tube layer 12 may also include a layer formed of synthetic resin.

A gauge G1 of the inner tube layer 12 may have a thickness that is from 3.0% to 17.0% (from 1.0% to 50.0%) of an inner diameter (internal diameter) D1 of the high-pressure hose 10. As an example, in cases in which the inner diameter D1 of the high-pressure hose 10 is from 6.0 mm to 75.0 mm, the actual dimension of the gauge G1 of the inner tube layer 12 may be in a range of from 0.9 mm to 3.4 mm. Note that the gauge G1 of the inner tube layer 12 may be modified as appropriate according to various conditions, such as the inner diameter D1 of the high-pressure hose 10 and pressure applied during use.

Woven Underlay-Layer

As illustrated in FIG. 1 and FIG. 2, the woven underlay-layer 16 is formed by sequentially winding n (n≥2) sheets of a strip-shaped woven underlay-material in a spiral shape.

The woven underlay-layer 16 of the present exemplary embodiment is formed by winding a first strip-shaped woven underlay-material 36 in a spiral shape onto the outer periphery of the inner tube layer 12, and also winding a second strip-shaped woven underlay-material 38 in a spiral shape onto an outer periphery of the first strip-shaped woven underlay-material 36 in the same direction and at the same pitch as the first strip-shaped woven underlay-material 36.

In the present exemplary embodiment, the strip-shaped woven underlay-material 36 and the strip-shaped woven underlay-material 38 have the same specifications. Explanation therefore follows regarding configuration of the strip-shaped woven underlay-material 36 as a representative example.

As illustrated in FIG. 3, the strip-shaped woven underlay-material 36 of the present exemplary embodiment is configured including plural warp yarns 40 that are arranged in parallel rows and extend along a length direction of the strip-shaped woven underlay-material 36, and plural weft yarns 42 that extend along a direction orthogonal to the warp yarns 40.

Note that although the strip-shaped woven underlay-material 36 is a plain weave material in this example, the method of weaving is not limited to plain weave. The strip-shaped woven underlay-material 36 is formed in a strip shape with a uniform width, in other words a ribbon shape or a band shape.

The strength of the warp yarns 40 may be in a range of from 590 N to 900 N. The strength of the weft yarns 42 may be in a range of from 315 N to 550 N. Note that the strength of the warp yarns 40 and the strength of the weft yarns 42 may be outside the above ranges. The strengths of the warp yarns and weft yarns are measured in accordance with JIS L 1096.

The strength of the warp yarns 40 of the present exemplary embodiment is 750 N as an example, and the strength of the weft yarns 42 of the present exemplary embodiment is 420 N as an example.

As an example, organic fibers such as polyamide (PA) or polyethylene terephthalate (PET) fibers may be employed for the warp yarns 40 and weft yarns 42, or fibers other than organic fibers may be employed therefor.

As illustrated in FIG. 1, an angle of inclination θ1 of the strip-shaped woven underlay-material 36 (that is the same as an angle of inclination of the warp yarns 40), and an angle of inclination of the strip-shaped woven underlay-material 38 (not illustrated in FIG. 1), with respect to a length direction of the high-pressure hose 10 may each be in a range of from 30° to 70°. Note that the angle of inclination θ1 may be outside the range of from 30° to 70°.

Although there is no particular limitation to a width W of the strip-shaped woven underlay-material 38 and a width (not illustrated in FIG. 1) of the strip-shaped woven underlay-material 36, material having a width in a range of from 20 mm to 180 mm may be employed as an example.

A thickness of the strip-shaped woven underlay-material 36 and a thickness of the strip-shaped woven underlay-material 38 both vary according to the weights of the warp yarns 40 and weft yarns 42, the method of weaving, and so on.

In the following explanation, two-layered portions of the woven underlay-layer 16 are allocated reference numerals $OR_2$, and three-layered portions of the woven underlay-layer 16 are allocated reference numerals $OR_3$.

As illustrated in cross-section in FIG. 2, a ratio $A_2/A_3$ may be from 0.2 to 32.0, wherein $A_n$ ($A_2$) is a width dimension of a portion of the strip-shaped woven underlay-material having n layers (in the present exemplary embodiment n=2, and so each of the two-layered portions $OR_2$) and $A_{n+1}$ ($A_3$) is a width dimension of a portion of the strip-shaped woven underlay-material having n+1 layers (in the present exemplary embodiment n=2+1, and so each of the three-layered portions $OR_3$) when the woven underlay-layer 16 of the high-pressure hose 10 is viewed in a cross-section along a length direction of the high-pressure hose (a direction running along an axial line CL in FIG. 1). Note that the width dimension $A_n$ and the width dimension $A_{n+1}$ are lengths of overlapping portions as measured along the length direction of the high-pressure hose 10.

As an example, in cases in which the inner diameter (internal diameter) of the high-pressure hose 10 of the present exemplary embodiment is from 6 mm to 75 mm, $0 < A_3 \leq 15$ (mm) may be set, wherein $A_3$ is the width dimension of the three-layered portions $OR_3$ of the strip-shaped woven underlay-material.

As illustrated in FIG. 1, the intermediate layer 18 is formed of an elastic material such as rubber and is disposed at the outer peripheral side of the woven underlay-layer 16. As an example, a gauge of the intermediate layer 18 is in a range of from 0.2 mm to 0.5 mm, but may be modified as appropriate according to the usage pressure, application, and so on of the high-pressure hose 10.

Reinforcing Cord Layers

As illustrated in FIG. 1, the first reinforcing cord layer 20 to the fourth reinforcing cord layer 32 are each formed by winding plural reinforcing cords 33 in a spiral shape. Note that reinforcing cords 33 in one reinforcing cord layer and reinforcing cords 33 in another reinforcing cord layer that neighbor one another in a radial direction are inclined in opposite directions to one another with respect to the length direction of the high-pressure hose.

Note that the reinforcing cords 33 in the first reinforcing cord layer 20 that neighbors the woven underlay-layer 16 are wound in the opposite direction to the winding direction of the strip-shaped woven underlay-material 36 and the strip-shaped woven underlay-material 38 of the woven underlay-layer 16, such that wound direction of the warp yarns 40 of the strip-shaped woven underlay-material 36 and wound direction the warp yarns 40 of the strip-shaped woven underlay-material 38 intersect wound direction of the reinforcing cords 33 of the first reinforcing cord layer 20.

In each of the first reinforcing cord layer 20 to the fourth reinforcing cord layer 32, an angle of inclination θ2 of the reinforcing cords 33 with respect to the length direction of the high-pressure hose may be in a range of from 40° to 60°.

As an example, metal cord is preferably employed for the reinforcing cords 33, and for example, brass-coated steel wire, stainless steel wire, or a known zinc-coated metal wire may be employed therefor.

The intermediate layer 22 is disposed between the first reinforcing cord layer 20 and the second reinforcing cord layer 24, the intermediate layer 26 is disposed between the second reinforcing cord layer 24 and the third reinforcing cord layer 28, and the intermediate layer 30 is disposed between the third reinforcing cord layer 28 and the fourth reinforcing cord layer 32.

The intermediate layers 22, 26, 30 are each formed of an elastic material such as rubber, and suppress friction between reinforcing cords 33 and reinforcing cords 33 that neighbor one another in the radial direction.

Outer Tube Layer

As an example, the outer tube layer 34 is formed of an elastic material such as rubber or synthetic resin that has excellent oil resistance, weather resistance, and abrasion resistance.

Operation and Advantageous Effects

Explanation follows regarding operation and advantageous effects of the high-pressure hose 10 of the present exemplary embodiment.

As an example, a swage-type hose joint (not illustrated in the drawings) is attached to an end portion of the high-pressure hose 10 of the present exemplary embodiment. During a procedure to attach the swage-type hose joint to the high-pressure hose 10, a nipple is inserted into the high-pressure hose 10, and a tube-shaped socket is disposed at the outer peripheral side of the high-pressure hose 10 and is swaged to reduce the diameter, such that the high-pressure hose 10 is clamped between the nipple and the socket.

In the high-pressure hose 10 of the present exemplary embodiment, the woven underlay-layer 16 configured by winding the strip-shaped woven underlay-material 36 and the strip-shaped woven underlay-material 38 in a spiral shape is provided between the inner tube layer 12 and the first reinforcing cord layer 20. This enables compression stress occurring due to swaging the hose joint socket to be dispersed and alleviated by the woven underlay-layer 16.

In the high-pressure hose 10 of the present exemplary embodiment, the gauge G1 of the inner tube layer 12 is in a range of from 0.9 mm to 3.4 mm, thereby enabling both flexing durability and anti-bulge performance to be achieved.

In the woven underlay-layer 16 of the present exemplary embodiment, the three-layered portion $OR_3$ where overlap portions 24A of the strip-shaped woven underlay-material 36 and one layer of the strip-shaped woven underlay-material 38 overlap one another, and the three-layered portion $OR_3$ where one layer of the strip-shaped woven underlay-material 36 and overlap portions 26A of the strip-shaped woven underlay-material 38 overlap one another are each formed in a spiral shape. This enables the reinforcing cords 33 of the first reinforcing cord layer 20 to be suppressed from digging into the woven underlay-layer 16 compared to cases in which there are no three-layered portions $OR_3$.

The woven underlay-layer 16 of the present exemplary embodiment is formed of two strip-shaped woven underlay-members that are the strip-shaped woven underlay-material 36 and the strip-shaped woven underlay-material 38, and the maximum number of overlaps (number of layers) of the strip-shaped woven underlay-material is three. Thus, the maximum thickness of the woven underlay-layer 16 is suppressed compared for example to a woven underlay-layer formed of two strip-shaped woven underlay-members and in which the maximum number of overlaps of the strip-shaped woven underlay-material is four.

Thus, the high-pressure hose 10 of the present exemplary embodiment that employs the two strip-shaped woven underlay-members improves flexibility and reduces the height difference of unevenness at the outer periphery of the high-pressure hose 10 so as to improve the external appearance, compared to a high-pressure hose including a woven underlay-layer and having a maximum number of overlaps of the strip-shaped woven underlay-material to be four.

In the high-pressure hose 10 of the present exemplary embodiment, by setting the ratio $A_2/A_3$ of the width dimension $A_2$ of the two-layered portions $OR_2$ of the strip-shaped woven underlay-material with respect to the width dimension $A_3$ of the three-layered portions $OR_3$ of the strip-shaped woven underlay-material to from 0.2 to 32.0, a balance can be achieved such that the reinforcing cord 33-suppression effect of suppressing the reinforcing cords 33 from digging into the woven underlay-layer 16 is obtained while the flexibility of the high-pressure hose 10 is obtained.

Moreover, as an example, by setting the width dimension $A_3$ of the three-layered portions $OR_3$ of the strip-shaped woven underlay-material to $0<A_3 \leq 15$ (mm) in cases in which the inner diameter D1 of the high-pressure hose 10 is from 6.0 mm to 75.0 mm, a balance can be obtained with respect to the flexibility of the high-pressure hose 10.

In the high-pressure hose 10 of the present exemplary embodiment, by selecting the angle of inclination $\theta 1$ of the warp yarns 40 of the strip-shaped woven underlay-material 36, 38 with respect to the length direction of the high-pressure hose in a range of from 30° to 70°, the high-pressure hose 10 has an optimal bending rigidity, and is suppressed from becoming too stiff (which could cause the warp yarns 40 to jut out and stiffen) or too flexible with respect to bending.

Moreover, configuring the woven underlay-layer 16 of the two strips of strip-shaped woven underlay-material (the strip-shaped woven underlay-material 36, 38), and selecting the number of overlapping sheets of the strip-shaped woven underlay-material of the woven underlay-layer 16 to three sheets as in the high-pressure hose 10 of the present exemplary embodiment enables any detriment to the external appearance or reduction in flexing performance to be suppressed while securing durability. This also enables a reduction in weight to be achieved compared to cases in which the woven underlay-layer 16 is configured of three or more sheets of strip-shaped woven underlay-material. The present exemplary embodiment thereby enables an improved high-pressure hose 10 to be provided.

Test Example 1

In order to confirm the advantageous effects of the present disclosure, a computer simulation was performed to compare the external appearance and flexing durability of a high-pressure hose according to a Comparative Example and a high-pressure hose of an Example of the present disclosure.

The structure of the exemplary embodiment illustrated in FIG. 1 to FIG. 3 was applied as the high-pressure hose of the Example.

Figure 4:
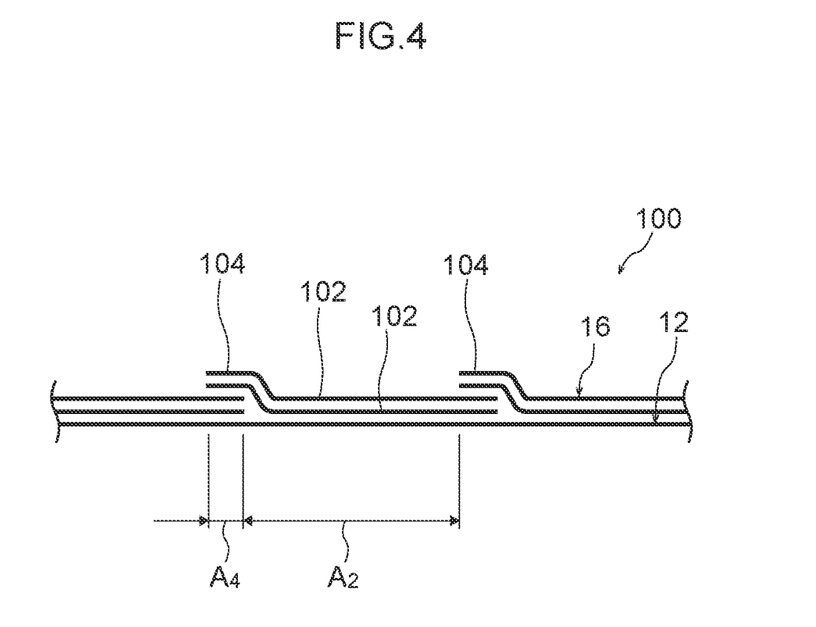
FIG. 4 is a cross-section taken along an axial line, illustrating a woven underlay-layer of a high-pressure hose according to a Comparative Example.

FIG. 4 illustrates a high-pressure hose 100 according to the Comparative Example. Note that the same reference numerals are allocated to the same configuration as that in the high-pressure hose 10 of the exemplary embodiment described above, and explanation thereof is omitted. In the high-pressure hose 100 according to the Comparative Example, two sheets of strip-shaped woven underlay-materials 102 are overlaid on one another, and are wound in a spiral shape around the outer periphery of the inner tube layer 12 so that one width direction portions of the two sheets of strip-shaped woven underlay-materials 102 are overlapped and form overlap portions 104 that have four layers, and the woven underlay-layer 16 is configured thereby.

The specifications (common areas) of the high-pressure hose according to the Example and the high-pressure hose 100 according to the Comparative Example are as given below.

Nominal diameter D1: 19.0 mm.
Inner tube layer: Material is NBR rubber. Gauge G1 is 1.5 mm.
Strip-shaped woven underlay-material: Warp yarn material is nylon 6, strength is 590 N. Weft yarn material is nylon 6, strength is 350 N. Width is 50 mm. Angle of inclination $\theta 1$ with respect to a length direction of the high-pressure hose is 50°.
First to fourth reinforcing cord layers: Cord material is steel, cord angle of inclination is from 52.8° to 56.9°.
Intermediate layers: Gauge is 0.30 mm.
Outer tube layer: Gauge is 1.40 mm.

Differences in the specifications of the high-pressure hose according to the Example and the high-pressure hose 100 according to the Comparative Example are as given below.

Configuration of woven underlay-layer of high-pressure hose according to Example: Width $A_2$ of two-layered portions is 22.7 mm, width $A_3$ of three-layered portions is 6.4 mm (two-layered portion width $A_2$/three-layered portion width $A_3$=3.5).

Configuration of woven underlay-layer of high-pressure hose 100 according to Comparative Example: Width $A_2$ of two-layered portions is 22.7 mm, width $A_4$ of four-layered portions is 6.4 mm (two-layered portion width $A_2$/four-layered portion width $A_4$=3.5).

External appearance: The height difference of unevenness at the outer periphery of the high-pressure hoses was derived by simulation, and evaluated as an index representation with the Comparative Example set to 100. Note that the larger the index value, the lower the height difference of unevenness and the better the external appearance.

Flexing durability: The high-pressure hose was made to curve by orienting one hose joint of the high-pressure hose horizontally and orienting the other hose joint perpendicularly, and the other hose joint was moved back and forth in a horizontal direction with the one hose joint in a fixed state, such that the radius of curvature of the curved high-pressure hose was alternately increased and decreased.

The flexing durability was evaluated as an index representation with the frequency (500,000 times) at which the high-pressure hose of the Comparative Example failed set to 100. Note that the larger the index value, the better the flexing durability.

Anti-bulge performance: The high-pressure hose with a hose joint swaged thereto was inserted into an oven and the temperature was raised from 80° C. to 150° C. at increments of 10° C. A visual check was made for the occurrence of bulges at each temperature. The results were scored, and represented as an index with the Comparative Example set to 100. Note that the larger the index value, the better the anti-bulge performance.

TABLE 1

|  | Comparative Example | Example |
| --- | --- | --- |
| External appearance | 100 | 200 |
| Flexing durability | 100 | 207 |
| Anti-bulge performance | 100 | 130 |

As is indicated by the test results in Table 1, the high-pressure hose of the Example applied with the present disclosure has excellent external appearance, flexing durability, and anti-bulge performance compared to the high-pressure hose according to the Comparative Example.

Test Example 2

A computer simulation was performed for high-pressure hoses A to E of Examples applied with the present disclosure in which the ratio $A_2/A_3$ of the width $A_2$ of the two-layered portions $OR_2$ of the strip-shaped woven underlay-material with respect to the width $A_3$ of the three-layered portions $OR_3$ of the strip-shaped woven underlay-material was varied to investigate a relationship between the ratio $A_2/A_3$, flexing durability, and anti-bulge performance. Note that a similar simulation to that for the high-pressure hoses A to E of the Examples was also performed for a high-pressure hose according to a Comparative Example.

Specifications of high-pressure hoses A to E: Other than the ratio $A_2/A_3$, the same specifications as the Example in Test Example 1.

Specifications of high-pressure hose according to Comparative Example: The same specifications as the high-pressure hose according to the Comparative Example in Test Example 1.

Flexing durability: See Test Example 1. Evaluation was performed as an index representation with the Comparative Example high-pressure hose set to 100.

Anti-bulge performance: See Test Example 1. Evaluation was performed as an index representation with the Comparative Example high-pressure hose set to 100.

The test results for flexing durability and anti-bulge performance are given in Table 2 below.

TABLE 2

|  | Comparative Example high-pressure hose | High-pressure hose A | High-pressure hose B | High-pressure hose C | High-pressure hose D | High-pressure hose E |
|---|---|---|---|---|---|---|
| $A_2/A_3$ | $A_2/A_4$ 3.5 | 0.1 | 0.2 | 3.5 | 31 | 32 |
| Flexing durability | 100 | 70 | 114 | 208 | 822 | 847 |
| Anti-bulge performance | 100 | 126 | 123 | 130 | 100 | 98 |

As is indicated by the test results in Table 2, by selecting the ratio $A_2/A_3$ in a range of from 0.2 to 31, there is a good balance between flexing durability and anti-bulge performance.

Test Example 3

A computer simulation was performed for high-pressure hoses of Examples applied with the present disclosure in which the angle of inclination θ1 of the strip-shaped woven underlay-material was varied to investigate a relationship between the angle of inclination, bending stiffness and anti-bulge performance of the high-pressure hose.

Specifications of high-pressure hoses F to J employed in testing: Other than the angle of inclination θ1 of the strip-shaped woven underlay-material, the same as in Test Example 1.

Bending stiffness: Bending was performed in a state of inner tube rubber+woven underlay, and the bending radius when a kink occurred was compared. A bending stiffness of 100 on the index indicates a state in which a kink (fold) occurred at a bending radius of 310 mm. Evaluation was performed as an index representation with the high-pressure hose G set to 100. The higher the value, the greater the stiffness with respect to bending.

Anti-bulge performance: See Test Example 1. Evaluation was performed as an index representation with the high-pressure hose I set to 100.

The test results for bending stiffness and anti-bulge performance are given in Table 3 below.

TABLE 3

|  | High-pressure hose F | High-pressure hose G | High-pressure hose H | High-pressure hose I | High-pressure hose J |
|---|---|---|---|---|---|
| Angle of inclination | 29° | 30° | 50° | 70° | 71° |
| Bending stiffness | 101 | 100 | 87 | 74 | 74 |
| Anti-bulge performance | 162 | 160 | 130 | 100 | 99 |

As is indicated by the test results in Table 3, by selecting the angle of inclination θ in a range of from 30° to 70°, there is a good balance between anti-bulge performance and bending stiffness.

Test Example 4

A computer simulation was performed for high-pressure hoses of Examples applied with the present disclosure in which the width $A_3$ of the three-layered portions $OR_3$ of the strip-shaped woven underlay-material was varied to investigate a relationship between the width $A_3$ of the three-layered portions $OR_3$, flexing durability, and anti-bulge performance.

High-pressure hose of Comparative Example: Same specifications as high-pressure hose according to Comparative Example of Test Example 1.

Specifications of high-pressure hoses K to O: Other than width $A_3$ of three-layered portions, the same as in Test Example 1.

Anti-bulge performance: See Test Example 1. Evaluation was performed as an index representation with the Comparative Example high-pressure hose set to 100.

Flexing durability: See Test Example 1. The flexing durability evaluation was performed as an index representation with the Comparative Example high-pressure hose set to 100.

The test results for anti-bulge performance and flexing durability are given in Table 4 below.

TABLE 4

|  | Comparative Example high-pressure hose | High-pressure hose K | High-pressure hose L | High-pressure hose M | High-pressure hose N |
|---|---|---|---|---|---|
| Width $A_3$ of three-layered portions $A_3$ (mm) | Width of four-layered portions is 6 mm | 0 | 6 | 11 | 12 |
| Anti-bulge performance | 100 | 102 | 130 | 154 | 159 |
| Flexing durability | 100 | 323 | 207 | 111 | 92 |

As is indicated by the test results in Table 4, selecting the width $A_3$ of the three-layered portions in a range of from 0 to 11 enables anti-bulge performance to be secured and also enables flexing durability to be improved.

Test Example 5

A computer simulation was performed for high-pressure hoses O to S applied with the present disclosure in which the gauge G1 of the inner tube layer was varied to investigate a relationship between the gauge G1, anti-bulge performance, and flexing durability.

High-pressure hose of Comparative Example: Same specifications as high-pressure hose according to Comparative Example of Test Example 1.

Specifications of high-pressure hoses P to T: Other than the gauge G1 of the inner tube layer, the same as the high-pressure hoses of the Examples in Test Example 1.

Flexing durability: See Test Example 1. Evaluation was performed as an index representation with the Comparative Example high-pressure hose set to 100.

Anti-bulge performance: See Test Example 1. Evaluation was performed as an index representation with the Comparative Example high-pressure hose set to 100.

The test results for anti-bulge performance and flexing durability are given in Table 5 below.

TABLE 5

|  | Comparative Example high-pressure hose | High-pressure hose O | High-pressure hose P | High-pressure hose Q | High-pressure hose R | High-pressure hose S |
|---|---|---|---|---|---|---|
| G1 (mm) | 1.5 | 0.8 | 0.9 | 1.5 | 3.4 | 3.5 |
| Anti-bulge performance | 100 | 165 | 152 | 130 | 104 | 89 |
| Flexing durability | 100 | 44 | 126 | 194 | 753 | 837 |

As is indicated by the test results in Table 5, by selecting the gauge G1 of the inner tube layer in a range of from 0.9 to 3.4, the anti-bulge performance can be secured and the flexing durability can be improved.

Other Exemplary Embodiments

Although one exemplary embodiment of the present disclosure has been described above, the present disclosure is not limited thereto, and obviously various other modifications may be implemented within a range not departing from the scope of the present disclosure.

Although the woven underlay-layer was formed using two strips of strip-shaped woven underlay-material in the above exemplary embodiment, the woven underlay-layer may be formed using three or more strips of strip-shaped woven underlay-material.

Although the woven underlay-layer 16 was formed by winding two strips of strip-shaped woven underlay-material with the same specifications in a spiral shape in the above exemplary embodiment, the woven underlay-layer 16 may be formed by winding plural strips of strip-shaped woven underlay-material with different specifications, such as different widths, materials, warp yarn strengths, and weft yarn strengths, in a spiral shape.

The entire content of the disclosure of Japanese Patent Application No. 2019-229174 filed on Dec. 19, 2019 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A high-pressure hose comprising:
   an inner tube layer;
   a cord reinforcing layer configured of a reinforcing cord wound in a spiral shape, and disposed at a radial direction outer side of the inner tube layer;
   an outer tube layer disposed at a radial direction outer side of the cord reinforcing layer; and
   a woven underlay-layer configured of n sheets of a strip-shaped woven underlay-material overlapped with one another and wound in a spiral shape, disposed between the inner tube layer and the cord reinforcing layer, and including an overlap portion at which one side portion and another side portion in a width direction of the same strip-shaped woven underlay-material are overlapped with one another, wherein:
   the woven underlay-layer is configured entirely by at least n layers of the strip-shaped woven underlay-material, and a number of overlaps of the strip-shaped woven underlay-material at the overlap portion is n+1, wherein n≥2.

2. The high-pressure hose of claim 1, wherein $A_n/A_{n+1}$ is from 0.2 to 32.0, wherein:
   $A_n$ is a width dimension of a portion of the strip-shaped woven underlay-material having n layers and $A_{n+1}$ is a width dimension of the overlap portion of the strip-shaped woven underlay-material having n+1 layers, in a case in which the woven underlay-layer is viewed in a cross-section along a length direction of the high-pressure hose.

3. The high-pressure hose of claim 1, wherein;
the woven underlay-layer is configured by two sheets of the strip-shaped woven underlay-material; and
a number of overlapping sheets of the strip-shaped woven underlay-material at the overlap portion is three sheets.

4. The high-pressure hose of claim 1, wherein $0<A_3\leq 11$ (mm), wherein $A_3$ is a width dimension of the overlap portion where a number of overlapping sheets of the strip-shaped woven underlay-material is n+1 sheets.

5. The high-pressure hose of claim 1, wherein:
the strip-shaped woven underlay-material includes a cord disposed along a length direction of the strip-shaped woven underlay-material; and
an angle of inclination of the cord with respect to a length direction of the high-pressure hose is in a range of from 30° to 70°.

6. The high-pressure hose of claim 1, wherein a gauge of the inner tube layer is from 0.9 mm to 3.4 mm.

7. The high-pressure hose of claim 2, wherein:
the woven underlay-layer is configured by two sheets of the strip-shaped woven underlay-material; and
a number of overlapping sheets of the strip-shaped woven underlay-material at the overlap portion is three sheets.

8. The high-pressure hose of claim 2, wherein $0<A_3\leq 11$ (mm), wherein $A_3$ is a width dimension of the overlap portion where a number of overlapping sheets of the strip-shaped woven underlay-material is n+1 sheets.

9. The high-pressure hose of claim 3, wherein $0<A_3\leq 11$ (mm), wherein $A_3$ is a width dimension of the overlap portion where a number of overlapping sheets of the strip-shaped woven underlay-material is n+1 sheets.

10. The high-pressure hose of claim 2, wherein:
the strip-shaped woven underlay-material includes a cord disposed along a length direction of the strip-shaped woven underlay-material; and
an angle of inclination of the cord with respect to a length direction of the high-pressure hose is in a range of from 30° to 70°.

11. The high-pressure hose of claim 3, wherein:
the strip-shaped woven underlay-material includes a cord disposed along a length direction of the strip-shaped woven underlay-material; and
an angle of inclination of the cord with respect to a length direction of the high-pressure hose is in a range of from 30° to 70°.

12. The high-pressure hose of claim 4, wherein:
the strip-shaped woven underlay-material includes a cord disposed along a length direction of the strip-shaped woven underlay-material; and
an angle of inclination of the cord with respect to a length direction of the high-pressure hose is in a range of from 30° to 70°.

13. The high-pressure hose of claim 2, wherein a gauge of the inner tube layer is from 0.9 mm to 3.4 mm.

14. The high-pressure hose of claim 3, wherein a gauge of the inner tube layer is from 0.9 mm to 3.4 mm.

15. The high-pressure hose of claim 4, wherein a gauge of the inner tube layer is from 0.9 mm to 3.4 mm.

16. The high-pressure hose of claim 5, wherein a gauge of the inner tube layer is from 0.9 mm to 3.4 mm.

\* \* \* \* \*